Figure 1:
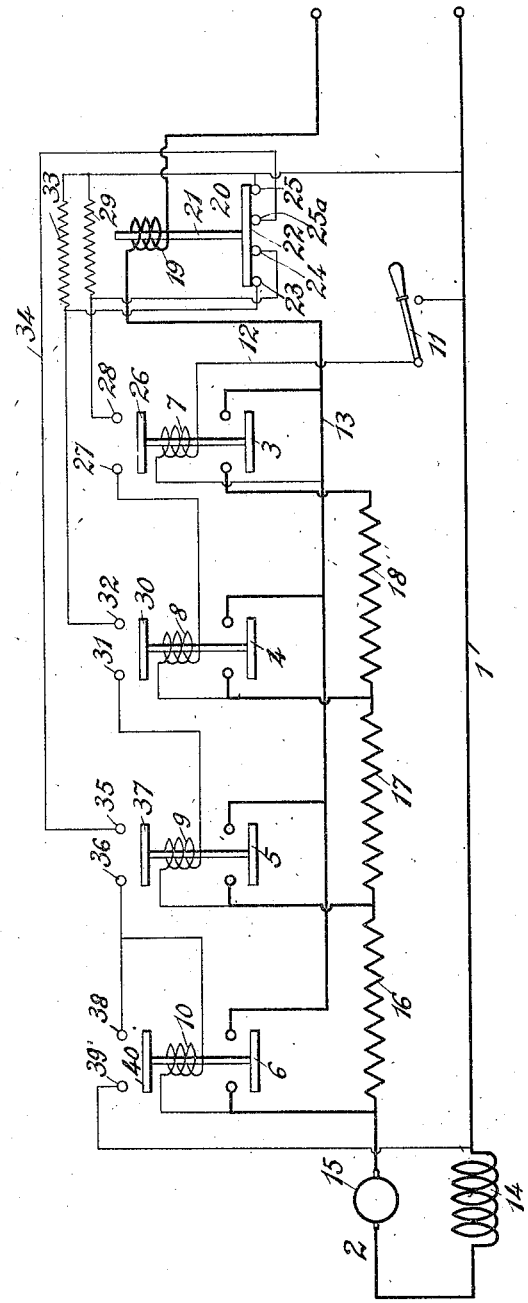

No. 888,903. PATENTED MAY 26, 1908.
H. D. JAMES.
CONTROL SYSTEM FOR ELECTRIC MOTORS.
APPLICATION FILED MAR. 3, 1906.

2 SHEETS—SHEET 1.

WITNESSES:
Camille Boulin
R J Dearborn

INVENTOR
Henry D James
BY
Philip G Carr
ATTORNEY

No. 888,903. PATENTED MAY 26, 1908.
H. D. JAMES.
CONTROL SYSTEM FOR ELECTRIC MOTORS.
APPLICATION FILED MAR. 3, 1906.
2 SHEETS—SHEET 2.
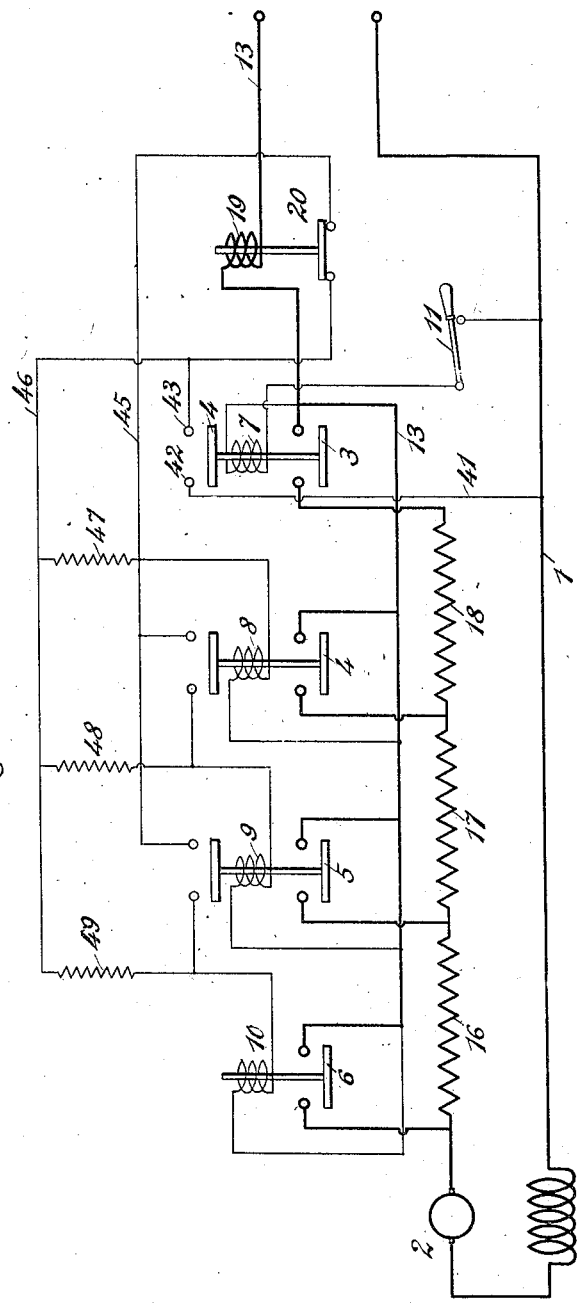
WITNESSES:
Camille Boulin
R. J. Dearborn
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC MOTORS.

No. 888,903.           Specification of Letters Patent.           Patented May 26, 1908.

Application filed March 3, 1906. Serial No. 304,111.

*To all whom it may concern:*

Be it known that I, HENRY D. JAMES, a citizen of the United States, and a resident of Pittsburg, in the county of Allegheny and State of Pennsylvania, have invented a new and useful Improvement in Control Systems for Electric Motors, of which the following is a specification.

My invention relates to systems of control for electric motors and has special reference to such systems as provide automatic acceleration.

The object of my invention is to provide, in a system which comprises a plurality of switches that are adapted to be operated in a predetermined sequence, a single operating magnet coil for each switch, means for subjecting the operation of said switches to limitations imposed by a device which is dependent for its action upon the current flowing in the motor circuit, and means for holding said switches closed by means of the operating coils, irrespective of the subsequent action of said device, and without interrupting the circuit established through the operating coils as the change takes place.

Control systems for electric motors which insure automatic acceleration and comprise interlocking switches for effecting the closure of the accelerating switches in a predetermined order, are preferably provided with a limiting device which delays the operation of the switches and which is dependent upon the current flowing in the motor circuit.

In order to prevent the switches from opening prematurely without the use of two independent magnet coils, one for closing the switch and the other for holding it in position when closed, it has been usual to provide means for transferring the operating coil from one circuit to another, as the switch is closed. This arrangement is restricted in its use to relatively low voltage circuits and involves several auxiliary contact terminals for each accelerating switch.

In order to simplify the apparatus and avoid the restrictions of the prior art, I provide, according to my present invention, a resistance in multiple circuit with said limiting device which so reduces the current flowing through the coil that the magnetic pull exerted is not sufficient to close the switch but is sufficient to hold it closed when it has been moved to such position.

Figures 1 and 2 of the accompanying drawings are diagrammatic views of systems embodying my invention.

Referring to Fig. 1, energy is supplied from a line conductor 1 to a motor 2, through switches 3, 4, 5 and 6 which are adapted to be closed, in the order indicated, by the action of a plurality of magnet coils 7, 8, 9 and 10, respectively. The action of the aforesaid switches is dependent upon a manually-operated switch 11 and when this switch is closed, energy is first supplied from the line conductor 1, through a conductor 12 to the operating magnet coil 7 of the switch 3, the other terminal of which is connected to an opposite line conductor 13. When the switch 3 is closed, circuit is completed from the line conductor 1 through field magnet winding 14 and armature 15 of the motor 2, resistance sections 16, 17 and 18, switch 3 and the series magnet coil 19 of a limiting device 20. The limiting device 20 comprises a movable core portion 21, a bridging contact member 22 attached thereto and a plurality of contact terminals 23, 24, 25 and 25ª which are adapted to be engaged by the bridging contact member when the current flowing through the coil 19 is less than a predetermined value. The switch 3 is provided with a bridging contact member 26 which is adapted to engage contact terminals 27 and 28, when the switch is closed, and completes a circuit from the line conductor 1, through an auxiliary resistance section 29, magnet coil 8 and resistance section 18 to the line conductor 13. The resistance of this circuit is such as to prevent the closure of the switch 4 unless a second circuit is also completed in parallel with the resistance 29 through contact terminals 25 and 24. When the switch 3 is first closed, the motor 2 being at rest, the current traversing the circuit will usually be sufficient to separate the bridging contact member 22 from the contact terminals 23, 24, 25 and 25ª so that the switch 4 may not be closed until the speed of the motor has increased and the magnet winding 19 of the limiting device has become sufficiently deënergized. The switch 4 is similar to the switch 3, being provided with a bridging contact member 30 to engage contact terminals 31 and 32 to complete a circuit from line conductor 1 through an auxiliary resistance 33 and the magnet coil 9 of the switch 5, resistance sections 17 and switch 4 to the line conductor 13. If the limiting device 20 is opened subsequent to the closure of the switch 4, the current flowing through the resistance 28 and the magnet coil 8 will be sufficient to retain the switch in its closed position, although such current would be insufficient to close it. Adequate current is similarly supplied through resistance 33 to the magnet coil 9 of the switch 5 to hold it closed but, in order to close the switch when it is open, a circuit must be completed from line conductor 1 through contact fingers 25 and 23 and the bridging contact member 22. A circuit may finally be completed through magnet coil 10 of the switch 6 when the switch 5 is closed and when contact member 22 is in engagement with contact terminal 25, from line conductor 1 through a conductor 34, that is connected to the contact terminal 25ª and contact terminals 35 and 36 which are engaged by bridging contact member 37 when the switch 5 is closed. The switch 6 is held in its closed position irrespective of the limiting device 20, since a circuit is completed from the line conductor 1, through contact terminals 38 and 39, which are engaged by a bridging contact member 40 and since the contact finger 39 is connected to one terminal of the magnet winding 10. In this way, the operation of each successive switch is dependent upon the limiting device 20 while each switch is held in its closed position irrespective of said device.

Reference may now be had to Fig. 2 which is illustrative of a system having a slightly modified circuit arrangement and in which a single circuit is interrupted by the limit switch. Energy is supplied, as in Fig. 1, from a line conductor 1 to a motor 2, the amount of resistance included in the circuit being determined by switches 3, 4, 5 and 6, as before. The switches 3, 4, 5 and 6 are adapted to be closed, in the order named, by the successive energizing of magnet coils 7, 8, 9 and 10. When the control switch 11 is closed, energy is supplied from the line conductor 1 to magnet coil 7, from which point circuit is completed through magnet winding 19 of the limit switch 20 to the opposite line conductor 13. When the switch 3 is closed, energy is supplied from the line conductor 1 through a conductor 41, and contact terminals 42 and 43 of the switch 3, which are connected by a bridging contact member 44, circuit being completed from the contact terminals 43 through the limit switch 20 and conductor 45, to the magnet winding 8 of the switch 4, and also from contact terminal 43 through conductor 46 and resistance 47 to said winding the opposite terminal of which is connected to the line conductor 13. The resistance 47 corresponds to the resistance 29 of Fig. 1 and allows sufficient energy to be supplied to the coil 8 to hold the switch 4 closed, after it has been moved to such position by energy supplied thereto directly through the limit switch 20. In a similar manner, the switches 5 and 6 are successively closed by the energizing of the magnet windings 9 and 10, dependent in each instance, upon the closure of the limit switch 20, the several switches being held in closed position by energy supplied through the resistance sections 48 and 49 and from circuits which are independent of the limit switch. As the switches 4, 5 and 6 are successively closed, the resistance sections 18, 17 and 16 are short-circuited. Other modifications of the circuit arrangements may be readily conceived by those familiar with the art for effecting similar results and I desire that such variations shall be included within the scope of my invention.

I claim as my invention:

1. In a control system for electric motors, the combination with a series of switches that are adapted to close in a predetermined sequence, a single operating coil for each switch, and a limiting device that may retard the sequential closure of the switches, of resistance sections connected in multiple circuit and short-circuited by the limiting device when the current traversing the motor circuit is less than a predetermined value.

2. The combination with a series of switches that are adapted to close in a predetermined sequence, operating magnet coils therefor and a limit switch dependent upon a predetermined current traversing the motor circuit for retarding the sequential closure of the switches, of means for making the energizing of each coil independent of the limit switch as its switch is closed without interrupting the circuit through the coil, said means comprising resistance sections which are connected in multiple circuit and are short-circuited when the limit switch is closed.

In testimony whereof, I have hereunto subscribed my name this 27th day of February, 1906.

HENRY D. JAMES

Witnesses:
 EDWIN E. LEHR,
 BIRNEY HINES.